Aug. 3, 1965     H. MERKER ETAL     3,197,954
LINK CHAIN FOR GUIDING ELECTRIC CABLES AND THE LIKE
Filed Feb. 5, 1962     2 Sheets-Sheet 2
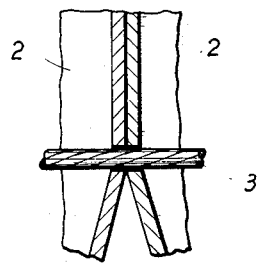
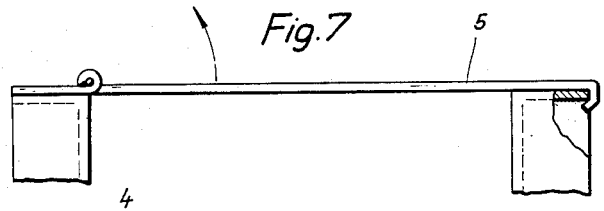
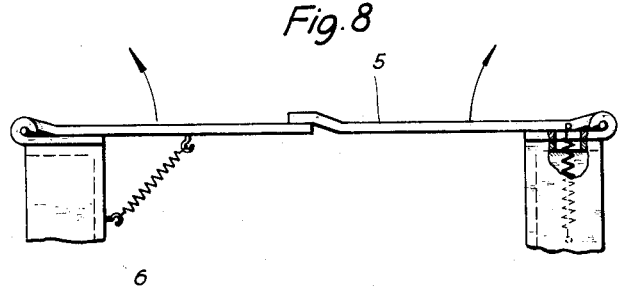

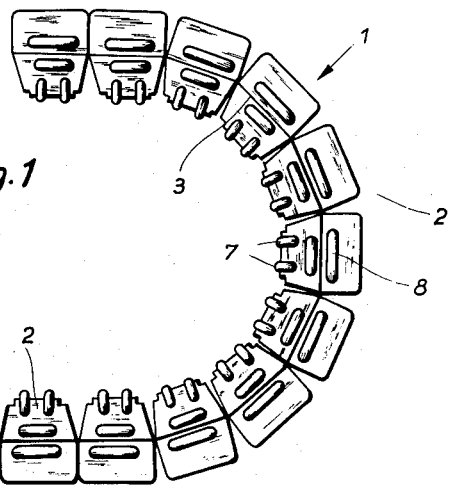
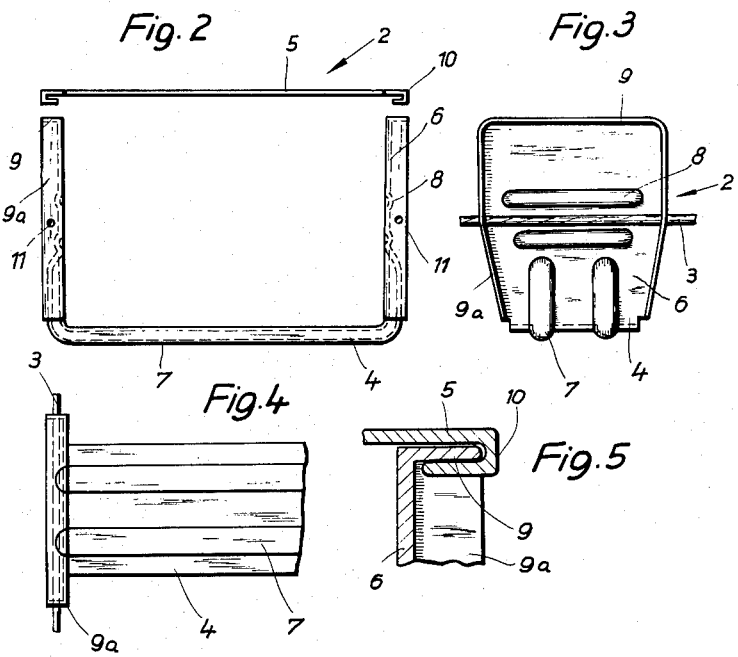

United States Patent Office 3,197,954
Patented Aug. 3, 1965

3,197,954
LINK CHAIN FOR GUIDING ELECTRIC CABLES AND THE LIKE
Herbert Merker, Siegen, Westphalia, and Kurt Loos, Dreis-Tiefenbach, Germany, assignors to Kabelschlepp G.m.b.H., Siegen, Westphalia, Germany
Filed Feb. 5, 1962, Ser. No. 171,013
Claims priority, application Germany, Feb. 8, 1961, K 42,845
3 Claims. (Cl. 59—78.1)

The present invention relates to a link chain for guiding electric cables, compressed air conduits, oil conduits and the like from a stationary connecting point to a movable consumer. The individual links of the chain must be linked to each other in such a way that the same is self-supporting but can be bent in one direction.

The links of heretofore known energy-feeding chains consist of lateral plates or the like which are interconnected by means of transverse webs. Said transverse webs or struts have openings for individual conduits or larger passages for a nest of conduits, and the respective conduits may be clamped in said openings or passages in order to secure the location thereof. The individual chain members are linked to each other through the intervention of their outer plates which are so designed that a bending of the chain can be effected in one direction only, whereas the chain is self-supporting in the other direction.

These known energy-feeding chains are provided for feeding electric current, gaseous or liquid media to machine elements to be moved, for instance supports of machine tools, crane carriages or the like. Such chains are particularly provided for feeding various energy conductors and for the transfer of power over great distances at relatively high speed. The high requirements as to versatility of employment and security naturally require high expenses and complicated constructions.

It is, therefore, an object of the present invention to provide an energy-feeding chain which, when the distance of movement, the speed of movement and the frequency of movement are not too high, will be extremely simple and will be able to carry a great number of relatively thin cables or conduits.

It is further object of this invention to provide a low cost chain as set forth in the preceding paragraph, which is particularly suitable for telephone exchanges for connecting movable and displaceable relay frames and the like.

These and other objects and advantages of the invention will appear more clearly from the following specification in connection with the accompanying drawing, in which:

FIG. 1 is a view of a portion of a chain according to the present invention.

FIG. 2 is a front view of an individual chain link with the lid in lifted-off position.

FIG. 3 is a side view of an individual chain link.

FIG. 4 is a top view of a portion of the lower part of a chain link.

FIG. 5 shows the connection between the lower portion and the lid of a chain link.

According to the present invention, the individual interconnected chain links are so designed that they have a box-shaped cross section closed at four sides. The box formed by the entire link chain is adapted to receive a relatively great number of individual cables or conduits while a connection of said cables or conduits to the individual chain links is dispensed with. This is possible without difficulties when the chain is moved only relatively seldom and furthermore is moved over short distances only at a low speed. Due to the fact that the link chain is practically closed at all sides without preventing the necessary air circulation, the possibility of damaging the cables by outer influences will be reduced. If, however, it is necessary to connect the cables to all or individual chain links, at any rate an individual suspension will not be necessary. Instead it will suffice, for instance by an adjustable transverse yoke or the like, to press the cables in their entirety against the bottom of the individual chain link.

According to an embodiment which has proved highly advantageous, each chain link consists of a U-shaped lower member with outwardly resilient legs and with a lid interconnecting the leg ends. Thus, the lid can without difficulties, by compressing the resilient side walls or legs of the chain links, be placed upon the same. To this end, the lid and the leg ends of the U-shaped lower member of each link are so designed that they interengage each other in a hook-shaped manner. An undesired opening or dropping off of the lid will thus be impossible. It is, of course, to be understood that the lid may also be connected to the chain link in any other convenient manner. For instance, the lid could be connected to one of the legs by hinge means or could be split and the split portions could respectively be connected by hinge means to the legs. The lid portions could either abut when closed or could overlap each other and could be held in closed condition by spring means. The chain which is closed on all sides can thus be opened or closed partially or completely over its entire length.

Preferably, the lower portions and the lid of the chain links are stamped or bent of sheet metal adapted to be deep-drawn. These parts may also be provided without difficulties with the required reinforcing ribs or the like.

The individual chain links are interconnected by pretensioned steel wires which may be bent off at the connecting portions. These steel wires respectively extend on the outside of the chain and more specifically in the center of the legs of the U-shaped lower portion of the chain links. It is sufficient to provide on each side of the chain links a pretensioned steel wire, for instance a piano wire. If desired, the individual chain links may be interconnected by a hinge means or other known joints to form the link chain.

Referring now more specifically to the drawing, the link chain 1 for guiding electric cables or other conduits from a non-illustrated stationary connection to a likewise non-illustrated consumer is composed of individual chain links 2 which are hingedly connected to each other by pretensioned lateral steel wires 3, for instance piano wires. The individual link chains are composed of a lower member 4 and a lid 5 adapted to be placed thereon. Both parts are stamped for instance of sheet metal which is adapted to be deep-drawn, and if required are bent.

The lower portion 4 of the chain link is bent in a U-shaped manner, and its legs 6 are slightly bent outwardly. However, said legs may be resiliently pressed inwardly. At the bottom of the lower part 4 and also at the legs 6 there are provided reinforcing ribs 7 and 8 which were formed during the manufacture of the lower part 4. The upper end of the legs 6 has an outwardly directed hook-shaped portion 9 adapted to be engaged by a corresponding hook 10 at the lateral edge portions of lid 5 (FIG. 5). Due to the resilient design of legs 6, said legs will always be pressed into the hook 10 of lid 5 when the latter is placed upon said legs. An accidental dropping off or opening of the lid 5 will thus be impossible.

The hook-shaped portion 9 merges with bent portions 9a provided at the vertical confining surfaces of legs 6. Said bent portions 9a serve to create a good engaging surface between the interlinked chain links 2. Moreover, said bent portions 9a have approximately at the central portion of the box-shaped chain links two openings 11 through which pass the tensioned steel wires 3. Below the steel wires 3, the legs 6 of the lower part 4 taper in order to permit a bending of the chain in one direction.

It is, of course, to be understood that the present invention is, by no means, limited to the particular construction shown in the drawing but also comprises any modifications within the scope of the appended claims.

What we claim is:

1. A link chain for guiding flexible elements such as electric cables, conduits and the like from a stationary connection to a movable consumer, which comprises: a plurality of chain links, each chain link having a lower member of U-shaped cross section with laterally spaced outwardly resilient legs and also having a substantially planar lid member extending between the ends of said legs and closing the open side of the respective chain link, latch means on the ends of the legs and on the side edges of said lid member in interfitting engagement interconnecting the lid member with the legs whereby the lid member is retained in engagement with said legs while simultaneously pulling said legs toward each other, said latch means being releasable upon movement of said legs toward each other to permit removal of said lid member from the chain link, elongated flexible means extending along the link chain and supportingly engaging said legs of each said chain link in a region thereof located about midway between the said lid member and the closed side of the said lower member, the said legs of adjacent chain links abutting between said flexible means and said lid member while being inclined away from each other between said flexible means and the closed side of said lower member when the chain is straight whereby said link chain is self supporting against bending in one direction but is bendable a predetermined amount in the opposite direction, each link being adapted to receive a bundle of flexible elements such as cables or the like between the legs of the links when said lid member is removed from said lower member, said legs being adapted to grippingly engage said bundle of elements when said legs are pulled toward each other by said lid member.

2. A link chain according to claim 1, in which said latch means is formed by bending the side edges of said lid member inwardly to form groove means and by forming the outer ends of said legs outwardly to form tongue means engageable in said groove means.

3. A link chain according to claim 2, wherein the said elongated flexible means comprises pre-loaded wire means extending along each side the link chain outside the legs of said chain links and supportingly engaging each chain link at the opposite ends thereof.

References Cited by the Examiner

UNITED STATES PATENTS

| 800,054 | 9/05 | Ayres | 138—163 |
| 834,742 | 10/06 | Lutz | 138—163 |
| 1,055,173 | 3/13 | Hodkinson | 138—156 |
| 2,137,536 | 11/38 | McConnell | 138—163 |
| 2,802,487 | 8/57 | Breehl | 138—156 |
| 2,975,807 | 3/61 | Waninger | 138—108 |

FOREIGN PATENTS 583,555 12/46 Great Britain.

CHARLES W. LANHAM, *Primary Examiner.*